United States Patent [19]

Rieber

[11] Patent Number: 5,106,510
[45] Date of Patent: Apr. 21, 1992

[54] COMBINED FILTRATION AND FIXATION OF HEAVY METALS

[75] Inventor: Roy S. Rieber, Houston, Tex.
[73] Assignee: enviroGuard, Inc., Houston, Tex.
[21] Appl. No.: 666,788
[22] Filed: Mar. 8, 1991
[51] Int. Cl.⁵ .............................................. C02F 11/14
[52] U.S. Cl. .................................... 210/717; 210/724; 210/751; 210/912; 106/624
[58] Field of Search ........ 210/717, 724, 751, 912–914; 106/624; 423/326–328, 333, DIG. 20

[56] References Cited

U.S. PATENT DOCUMENTS

| | | | |
|---|---|---|---|
| 1,949,644 | 3/1934 | Benjamin | 210/205 |
| 3,451,944 | 6/1969 | Finch | 252/421 |
| 3,841,102 | 10/1974 | Conner et al. | 210/751 |
| 4,105,459 | 8/1978 | Meta | 106/98 |
| 4,226,630 | 10/1980 | Styron | 210/751 |
| 4,460,292 | 7/1984 | Durham et al. | 106/98 |
| 4,488,908 | 12/1984 | Goodwin | 106/75 |
| 4,518,508 | 5/1985 | Conner | 210/751 |
| 4,645,605 | 2/1987 | Durham | 210/679 |
| 4,900,360 | 2/1990 | Whitescarver et al. | 210/751 |
| 4,948,516 | 8/1990 | Fisher et al. | 210/751 |
| 5,008,021 | 4/1991 | Conner | 210/757 |

*Primary Examiner*—Ivars Cintins
*Assistant Examiner*—Neil M. McCarthy
*Attorney, Agent, or Firm*—James F. Weiler

[57] ABSTRACT

The present invention describes a filter medium and a method of filtering metals from liquids, such as waste water, in which the metals are filtered from the liquids and are chemically fixed in the resulting filter cake in a nonhazardous and nontoxic form so that they may be disposed of in nonhazardous landfills. When all or a portion of the metals are dissolved, they are first precipitated and then filtered and chemically fixed.

20 Claims, No Drawings

COMBINED FILTRATION AND FIXATION OF HEAVY METALS

FIELD OF THE INVENTION

The present invention relates to filtering and chemically fixing in the filter medium hazardous heavy metals in liquids and particularly in waste waters.

BACKGROUND OF THE INVENTION

Large quantities of hazardous metal-contaminated waste water and other liquids have been discharged in the environment without treatment. Current federal and state regulations limit the hazardous metal concentrations in waste water and are extremely severe and are frequently based on analytical detection limits. Most metals are present in the waste water at concentrations which can range from 10 to 4,000 parts per million. Under some current regulations, all hazardous metal concentrations in waste water are required to be less than 300 parts per billion and some to less than 20 parts per billion. The hazardous metals include cadmium, chromium, copper, lead, manganese, selenium, as well as others. In addition, it is desirable to remove and fix all metals, some of which are currently considered to be nonhazardous, such as zinc. These hazardous metals, as well as nonhazardous metals, are frequently dissolved in waste water and, in order to remove them, it is necessary first to precipitate them. This is accomplished by any number of known technologies, for example, hydroxide precipitation, chemical oxidation, insoluble salt formation and the like. Metal hydroxide precipitation is perhaps the most common at the present time. While metal hydroxide precipitation is a widely known and extensively used method for removing metals from waters, the resulting slurry from metal hydroxide precipitation has been difficult to filter, and the filter cake is hazardous and will not pass regulatory tests for hazardous characteristics. It is highly desirable to provide for the removal of heavy metals from waste waters in which the dissolved metals are precipitated, the filter ability of the resulting slurry of precipitated metals is improved, and the hazardous metals are chemically fixed in the filter cake which is readily removable and which filter cake is nonhazardous and does not need to be disposed in a hazardous waste site.

SUMMARY OF THE INVENTION

The present invention is directed to such a filter medium for and to methods of filtering and chemically fixing hazardous dissolved metal, hazardous and nonhazardous, in liquids, such as waste waters. The dissolved metals are precipitated using any number of known technologies, such as hydroxide precipitation, chemical oxidation, insoluble salt formation and the like. Metal hydroxide precipitation is the most common and is preferred. The filter medium comprises silicious particles and at least one polyvalent metal ion, the silicious particles being present in an amount effective to filter the dissolved metal precipitates from and to form a soluble silicate in the liquid, the polyvalent metal ion being present in an amount sufficient to form a silicious cement with the soluble silicate and to chemically fix the metal particulates in the silicious cement. Accordingly, it is an object of the present invention to provide a filter medium in which precipitated dissolved metals are filtered from liquids such as waste waters and are chemically fixed in the filter medium, and the filter medium having the chemically fixed metals is nontoxic and nonhazardous.

A further object of the present invention is the provision of a method of filtration and chemically fixing metals precipitated in liquids, such as waste waters and recovering them in nontoxic or nonhazardous form.

A further object of the present invention is the provision of filtering liquids having precipitated dissolved metals from the liquids utilizing as the filter medium silicious particles and a polyvalent metal ion effective to dissolve at least a portion of the silicious particles to form a soluble silicate and sufficient to form a silicious cementitious product with the polyvalent metal ion effective to solidify and chemically fix precipitated dissolved metals.

Other and further objects, features, and advantages appear throughout the specification and claims.

DESCRIPTION OF PRESENTLY PREFERRED EMBODIMENTS

As previously mentioned, the present invention is directed to a means for and a method of filtering precipitated dissolved metals from liquids, such as waste waters utilizing silicious particles which filter all of the metal particulates, the silicious particles forming a soluble silicate from the liquids, and in the presence of a polyvalent metal ion forms a silicious cement chemically fixing the precipitated metal particles.

The filter medium for filtering and chemically fixing precipitated dissolved metals in liquids, such as waste water, includes silicious particles and at least one polyvalent metal ion, the silicious particles are present in an amount sufficient to filter the metal precipitates and form a sufficient amount of soluble silicate in the liquid for the cement reaction, and the polyvalent metal ion is present in an amount sufficient to form a silicious cement with the silica particles and chemically fix the metal particulates in the silicious cement. If the polyvalent metal ion is present in such an amount in the waste water, it may be omitted from the filter medium.

The method of filtering and chemically fixing of precipitated dissolved metals in liquids, such as waste waters, comprises flowing the liquid through a filter comprised of a mixture of silicious particles in the presence of a polyvalent metallic ion, the silicious particles being effective to filter the metal particulates from the liquid and contain them, the liquid having a pH in a range sufficient to form a soluble silicate with the silicious particles but not to dissolve the metal precipitates, the polyvalent metal ion being present in the filter or waste water or both in an amount effective to form a silicious cement with the silicious particles and chemically fix and contain the metal precipitates.

The method of filtering and chemically fixing the metals in waste waters includes adding the silicious particles and polyvalent metallic ion to the waste waters after the pH has been adjusted, if necessary, to form a slurry which is then filtered which produces a cementitious filter cake with the metals chemically fixed and contained in the filter cake whereby the solids are captured in the filter and the liquid passes through. Both are now nonhazardous and the liquid has had the metals removed and the solids pass regulatory testing for hazardous waste characteristics.

The silicious particles preferably are amorphous, although crystalline particles may be utilized, but they tend to slow down the reaction period. The silicious particles preferably are biogenetic silica particles, such as those produced by pyrolysis or burning of plants and hulls containing large amounts of silica, that is, having a minimum of 15 percent silica by weight of the dry matter and preferably 20 percent or more which leaves an ash that is high in silica. If desired, a small amount of carbon uniformly dispersed throughout the silica structure may be included. The presently preferred biogenetic silica is rice hull ash. Other silicious particles, such as diatomaceous earth and perlite may be utilized. The silicious particles used should be capable of forming a soluble silicate in a caustic liquid or waste water.

The presently preferred polyvalent metal ion is Portland Cement (PC) because of its availability and price. Any polyvalent metal ion can be used which will react to form the silicious cement with the formed soluble silicate; for example, calcium oxide (quick lime), coal fly ash, potassium oxide, aluminum sulfate, alumina chlorohydrate and the like. Thus, any source of polyvalent metal ion can be used. In some cases, the preferred source may be one with limited solubility in waste so that the metal ion is released slowly over a long period of time; and, in other cases, it is acceptable to have the metal ion entirely in solution when the mixture is made. The alkali and the polyvalent metal may be in either solid or liquid form.

The relative proportions of the ingredients may vary from waste to waste.

As previously mentioned, of the biogenetic silica, rice hull ash is preferred although plants that contain 15 percent or more silica by weight in its dry matter are satisfactory, for example, stalks and hulls of rice, equisetum (horsetail weeds), certain bamboos and palm leaves, particularly polymra, pollen and the like, all of which when burned leave a porous ash that is highly desirable as a filtration medium. Preferably, the silicious particles should be amorphous although crystalline particles may be present. The only disadvantage to crystalline particles is that they slow down the reaction considerably.

It is important that all of the dissolved free metal ions be precipitated in metal hydroxide form so that they can be completely reacted with the silicious particles and the polyvalent metal ion. Therefore, the degree of alkalinity is controlled by the solubility of metal hydroxides being treated. The theoretical goal is to adjust the level of alkalinity so that the metal hydroxides are the least soluble. At this point of low insolubility it is most likely that the greatest amount of the free metal ions will have reacted to become metal hydroxide. This in turn insures a complete reaction with the silicious particles and the polyvalent metal ion. Thus, the dissolved metals will be precipitated and removed from the water and made reaction products fixed in the resulting silicious cement.

The presently preferred biogenetic silica is rice hull ash. Rice hulls are high in silica content, containing about 18 to 22 percent by weight, with the ash having a porous skeletal silica structure having approximately 75 to 80 percent open or void spaces by volume. In addition, it has been a continuing problem for the rice industry to dispose of rice hulls; and, while a number and variety of uses for rice hulls or rice hull ash have been proposed ad used, large volumes of rice hulls are burned; and their ash is disposed by the rice industry as a waste material at great expense.

Biogenetic silica in amorphous state and in substantially porous form can be obtained either by burning or decomposition of the hulls. Any process can be used to obtain the ash, preferably, high in amorphous silica.

As an example, commercially available rice hull ash can be used and is prepared by burning rice hulls in a furnace. In the process, raw rice hulls are continually added to the top of the furnace and the ash is continuously removed from the bottom. Temperatures in the furnace range from 800° to about 1400° C., and the time factor for the ash in the furnace is about three minutes. Upon leaving the furnace, the ash is rapidly cooled to provide ease in handling. When treated by this method, silica remains in a relatively pure amorphous state rather than the crystalline forms known as tridymite or crystobalite. The transition from the amorphous to the crystalline state generally takes place when the silica is held at very high temperatures, for example 2000° C. or longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the ash is in an amorphous state with a porous skeletal structure.

The amount of open or void spaces in the biogenetic silica ash depends on the amount of fines in the ash. The inclusion of fines is not deleterious; however, the more porous the ash the better.

On a commercial burning of rice hulls as an energy source, the resultant ash had the following chemical analysis (by weight):

| Silicon | 93.0–94.0 percent |
|---|---|
| Carbon | 5.0–5.5 percent |
| Balance | trace minerals |

The trace minerals consist of minor amounts of magnesium, barium, potassium, iron, aluminum, calcium, copper, nickel, and sodium.

The carbon content is in a dispersed state throughout the material. If desired, the carbon can be actuated for treating with super heated steam under standard conditions. This treatment removes particles that clog the pores of the carbon thus enormously increasing its filter ability.

As previously mentioned, the ash, rice hull ash or other agriash can be used satisfactorily irrespective of how it is obtained, but preferably should be predominantly amorphous.

In practice, a sample of the waste water containing the dissolved metal to be filtered and chemically fixed in a nonhazardous filter cake is obtained and tested.

Since it is important that all of the free metal ions in the waste water be precipitated or in metal hydroxide form so that they will be completely reacted with the silicious particles and the polyvalent metal ions, such as Portland cement, and the degree of alkalinity as controlled by the solubility of metal hydroxide being treated, the level of alkalinity preferably is adjusted so that the metal hydroxides are least soluble. At this point of low insolubility, it is most likely that the greatest amount of the free metal ions will have reacted to become metal hydroxide precipitates. This, in turn, insures a complete reaction with the silicious particles and the polyvalent metal ions. This results in the precipitated metals being removed from the water and made reaction products which are chemically fixed in the filter cake. As previously mentioned, metal hydroxide precipitation is a widely known and extensively used method for removing metals from waters. However, the slurry resulting from metal hydroxide precipitation is traditionally difficult to filter, and the filter cake will not pass regulatory tests for hazardous characteristics. Advantageously, treatment of metals in waste water yields a filter cake which passes regulatory testing for hazardous characteristics and, unexpectedly, improves filterability of the slurry.

Preferably, the first step is to optimize the hydroxide treatment. This optimization focuses on complete reaction of all of the free metal ions with the alkaline source and yields a comparison of free metal ion content in the water to pH for several alkaline sources, for example, calcium hydroxide, sodium hydroxide, potassium hydroxide, and the like. This screening will determine which alkaline source and pH is most effective.

The next step is to prepare the waste water at its proper alkalinity for optimal metal hydroxide formation by adding the silicious particles and polyvalent metal ions at varying levels and testing for filtration characteristics. In many cases, the amount of silicious particles and polyvalent metal ions necessary for filtration organization provides enough to satisfy the chemical requirements for fixation. For example, when utilizing 75 percent rice hull ash and 25 percent Type 1 Portland cement, the amount of silicious particles and polyvalent metal ions should be approximately five times that of all cations present in the water but no less than 2,000 parts per million (ppm). The five times ratio can be reduced for total cation concentrations in the water, for example, above 5,000 ppm.

In the case of where the requirement for filtration enhancement is far more than that required for chemical treatment, charged polyelectrolyte polymer flocculation can be used. The advantage is that the polymer works in concert with the silicious particles to enhance filtration characteristics and results in a far lower amount of silicious particles and polyvalent metal ions which lowers the treatment and disposal costs. The chemical properties of the silicious particles and polyvalent metal ions are not affected by this treatment as this is an extension of a property of silicious particles, such as rice hull ash which provide massive charge sites for charge polymers to seed from. This is extremely effective in several forms of filtration and clarifier technologies. The following examples are illustrative of the invention.

EXAMPLE 1

A product composed of a mixture of 75 percent rice hull ash (RHA) and 25 percent Type 1 Portland cement (PC) was used in a demonstration for United States Environmental Protection Agency's Superfund Innovative Technology Evaluation (SITE) program. In this program the EPA matches the application technology to an existing field problem from the Superfund listed sites. In the present example, the EPA provided Palmerton Zinc Superfund Site which is a ground water contaminated primarily with zinc. Cadmium and lead were also present but in low concentrations. The goal of the project was to demonstrate that the process and product could treat the ground water from about 450 ppm zinc to less than 1.5 ppm at commercial flow rates and yield a filter cake which would pass regulatory testing, that is be nonhazardous and may be disposed of in nonhazardous landfills.

In the first steps of the evaluation procedure the alkalinity source and amount were screened. Caustic soda (sodium hydroxide NaOH), and lime (calcium hydroxide, $Ca(OH)_2$) were evaluated. Lime was selected on cost and availability criteria. The screening data is reported in Table 1.

TABLE 1

| Alkaline Source, pH and Zn Removal | | |
|---|---|---|
| Alkaline Source | pH | Zinc in Filtrate (ppm) |
| Sodium Hydroxide | 9.1 | 0.49 |
| Calcium Hydroxide | 9.8 | ND |
| Calcium Hydroxide | 10.6 | 1.13 |
| Calcium Hydroxide | 11.6 | 12.1 |

The data in Table 1 indicates that the most effective range for total dissolved metal precipitation is 9.5 to 10.5. This corresponds to published chemical data.

The next step was to evaluate the product on filtration performance criteria. These data are presented in Table 2.

TABLE 2

| Product Amount vs Filter Flux | |
|---|---|
| Product Amount Gram/Liter | Filter Flux (gpm/ft$^2$)* |
| 5.9 | 0.55 |
| 11.1 | 0.74 |
| 20.0 | 1.32 |

*gpm/ft$^2$: gallon per minute per square foot of filter area

The final step in the evaluation is to confirm that the product was fixing the metals in the filter cake. These data are reported in Table 3.

TABLE 3

| | EP Tox* Filter Cake Leachate (ppm) | | |
|---|---|---|---|
| Product Amount (gram/Liter) | Zinc | Cadmium | Lead |
| 0 | 6630 | 0.73 | ND |
| 11.1, Tested at 10 Days | 1.5 | 0.06 | 0.26 |
| 11.1, Tested at 30 Days | 1.75 | 0.06 | 0.20 |
| 15.0, Tested at 10 Days | 0.3 | 0.04 | 0.31 |
| 15.0, Tested at 30 Days | 0.13 | 0.10 | 0.19 |

*EP Toxicity test, 40 CFR 261

It is significant as shown in Table 3 that the unmistakable trend is for the metal concentrations in the leachate from the filter cake to decrease over time. This trend will continue forever practically speaking.

The foregoing data confirm the mixture of 75 percent rice hull ash and 25 percent Type 1 Portland cement, provides improved filtration performance, and fixes the metals in the filter cake to render it nonhazardous.

EXAMPLE 2

In this example the problem consisted of a plant waste water that needed to be prepared for discharge into a costal area. Regulatory limits for this project are exceedingly low: 13 ppb Copper, 294 ppb Zinc, 56 ppb Lead, 227 ppb Chromium, and 132 ppb Nickel. The concentrations in the water prior to treatment were 2600 ppb Copper, 592 ppb Zinc, 413 ppb Nickel, 90 ppb Lead, and 434 ppb Chromium.

A product composed of 75 percent RHA, 25 percent PC and 10 parts per million polymer composed of highly charged, cationic high molecular weight polyacrylamide was used.

In this example there was no pH adjustment required for two reasons. First, the natural pH of the waste water ranged from 8.5 to 10.5, and it was determined that all of the metals were already in metal hydroxide form and there were little or no dissolved metals.

The testing then was directed to removing the suspended metals from the water, maximizing filtration flow rates and ensuring that the treated metals would not leach out of the filter cake.

The response to metals removal efficiency and flow rates versus the amount of the mixture of RHA and PE were determined at the same time. These data are reported in Table 4.

TABLE 4

Flux Metals Removal Efficient vs Product Amount

| RHA and PC Amount (gram/liter) | Filter Flux (gpm/ft$^2$) | Metals in Filtrate (ppb) | | |
|---|---|---|---|---|
| | | Cu | Zn | Ni |
| 0* | 3.44 | 171 | 78 | 66 |
| 1 | 1.48 | ND | 52 | ND |
| 2 | 1.84 | ND | 91 | ND |
| 3 | 3.83 | ND | 10 | ND |
| 4 | 4.22 | 30 | 6 | ND |

*An inert coarse filter aid was used at 0.5 gm/L.
ND = Not Detected. Detection Limits = 1 ppb Cu, 50 ppb Zn, and 100 ppb Ni.

These data confirm that the mixture of RHA and PC was effective at removing the metals from the water and that it also provided excellent filter aid performance.

The next step was to evaluate the ability of the mixture to fix the metals in the filter cake so that they would pass regulatory limitations. The data are reported in Table 5.

TABLE 5

Metals in Filter Cake Leachate vs Product Amount

| Product Amount (gram/Liter) | Filter Cake TCLP* (ppb) | | |
|---|---|---|---|
| | Cu | Zn | Ni |
| 0 | 640 | 350 | 770 |
| 2, Tested at 10 Days | 140 | 1700 | 130 |
| 2, Tested at 30 Days | ND | 4 | 14 |
| 3, Tested at 10 Days | 390 | 460 | 110 |
| 3, Tested at 30 Days | 5 | 26 | 64 |

*TCLP: Toxic Characteristic Leaching Procedure based on EPA recommended test (Fed Register 53 (159), Aug. 17, 1988 + EPA CFR Title 40, part 268)

Again, it is important to note that leachable metals concentration gets lower with time.

The amounts of the silicious particles and polyvalent metal ions can be varied considerably to accommodate the properties of the waste water in which the metals are filtered from and fixed in the filter cake in a nonhazardous manner. For example, the amount of the silicious particles can vary from 50 to 85 percent and the amount of polyvalent metal ions can vary from 15 to 50 percent, by weight. The amount of the filtration fixation mixture to be added to the waste water can be varied according to requirement of the waste water. This can vary from 1 to 100 grams per liter of waste water.

EXAMPLE 3

In this example, other biogenetic silica particles were substituted for rice hull ash in the preceding examples. These include the ash from stalks and hulls of rice, equisetum, bamboos and pollen leaves which when burned provide a porous ash that is highly desirable as a filtration medium. Satisfactory results were obtained by such substitution.

EXAMPLE 4

In this example, diatomaceous earth and perlite are substituted for the rice hull ash of the preceding examples and each provide satisfactory results. That is, the filtration of the precipitated metals was obtained and they were chemically fixed in the filter cake which was nonhazardous and did not need to be disposed of in a hazardous waste site.

EXAMPLE 5

In this example, calcium oxide and coal fly ash are each substituted for Portland cement in the preceding examples and each provide satisfactory results, that is filtration of the metals from the waste waters and containment of them in the filter cake which was nonhazardous.

EXAMPLE 6

In this example, the various components were added to the waste stream to form a slurry of silicious particles, polyvalent metal ions and a pH to precipitate the metals, and then the slurry was passed through a filter. A cementitious filter cake resulted in which the metals were removed from the waste stream and chemically fixed and which was nonhazardous.

The present invention therefore is well suited and adapted to attain the objects and ends mentioned as well as others inherent therein.

While presently preferred embodiments of the invention have been given for the purposes of disclosure, changes may be made therein and other applications may be made thereof which are within the spirit of the invention as defined by the scope of the appended claims.

What is claimed is:

1. A method of filtering and chemically fixing metal precipitates in a liquid comprising, flowing the liquid through a filter medium comprised of a mixture of silicious particles and in the presence of a polyvalent metal ion, the silicious particles filtering the metal precipitates from the liquid and containing them, the liquid having a pH in a range sufficient to form a soluble silicate with the silicious particles but not sufficient to dissolve the metal precipitates, thereby forming a soluble silicate by dissolving some of said silicious particles;

the polyvalent metal ions being present in an amount effective to form a silicious cement with said soluble silicate, thereby forming said silicious cement and chemically fixing said metal precipitates in said silicious cement, and wherein said liquid which has flowed through said filter medium is substantially free of said metal precipitates.

2. The method of claim 1 where,
   the silicious particles are biogenetic silica ash.
3. The method of claim 2 where,
   the filter medium includes at least a portion of the polyvalent metal ion.
4. The method of claim 1 where,
   the silicious particles are rice hull ash.
5. The method of claim 4 where,
   the filter medium includes at least a portion of the polyvalent metal ion.
6. The method of claim 1 where,
   the silicious particles are diatomaceous earth.
7. The method of claim 6 where, the filter medium includes at least a portion of the polyvalent metal ion.

8. The method of claim 1 where, the silicious particles are perlite.

9. The method of claim 8 where, the filter medium includes at least a portion of the polyvalent metal ion.

10. The method of claim 1 where, the filter medium includes at least a portion of the polyvalent metal ion.

11. A method of filtering and chemically fixing dissolved metals in waste water comprising, adding a metal hydroxide to the waste water in an amount sufficient to form metal hydroxide precipitates, flowing the waste water with the metal hydroxide precipitates through a filter medium comprised of a mixture of silicious particles and in the presence of polyvalent metal ions, the silicious particles filtering the hydroxide metal precipitates and containing them, the waste water having a pH in a range sufficient to form a soluble silicate with the silicious particles but not sufficient to dissolve the hydroxide metal precipitates, thereby forming a soluble silicate by dissolving some of said silicious particles, the polyvalent metal ions being present in an amount effective to form a silicious cement with said soluble silicate, thereby forming said silicious cement and chemically fixing the hydroxide metal precipitates in said silicious cement, and wherein said liquid which has flowed through said filter medium is substantially free of said metal precipitates.

12. The method of claim 11 where, the silicious particles are biogenetic silica ash.

13. The method of claim 12 where, the filter medium includes at least a portion of the polyvalent metal ions.

14. The method of claim 11 where, the silicious particles are rice hull ash.

15. The method of claim 14 where, the filter medium includes at least a portion of the polyvalent metal ions.

16. The method of claim 11 where, the silicious particles are diatomaceous earth.

17. The method of claim 16 where, the filter medium includes at least a portion of the polyvalent metal ions.

18. The method of claim 11 where, the silicious particles are perlite.

19. The method of claim 18 where, the filter medium includes at least a portion of the polyvalent metal ions.

20. The method of claim 11 where, the filter medium includes at least a portion of the polyvalent metal ions.

* * * * *

UNITED STATES PATENT AND TRADEMARK OFFICE
CERTIFICATE OF CORRECTION

PATENT NO. : 5,106,510
DATED : April 21, 1992
INVENTOR(S) : Roy S. Rieber

It is certified that error appears in the above-indentified patent and that said Letters Patent is hereby corrected as shown below:

Column 3, line 64, "ad" should read --and--.

Column 6, line 59, "costal" should read --coastal--.

Signed and Sealed this

Twenty-fifth Day of January, 1994

Attest:

BRUCE LEHMAN

*Attesting Officer*  *Commissioner of Patents and Trademarks*